Aug. 6, 1929.  F. SCHMIDLIN  1,723,379
AUTOMATIC SUBSTATION CONTROL
Filed May 25, 1927
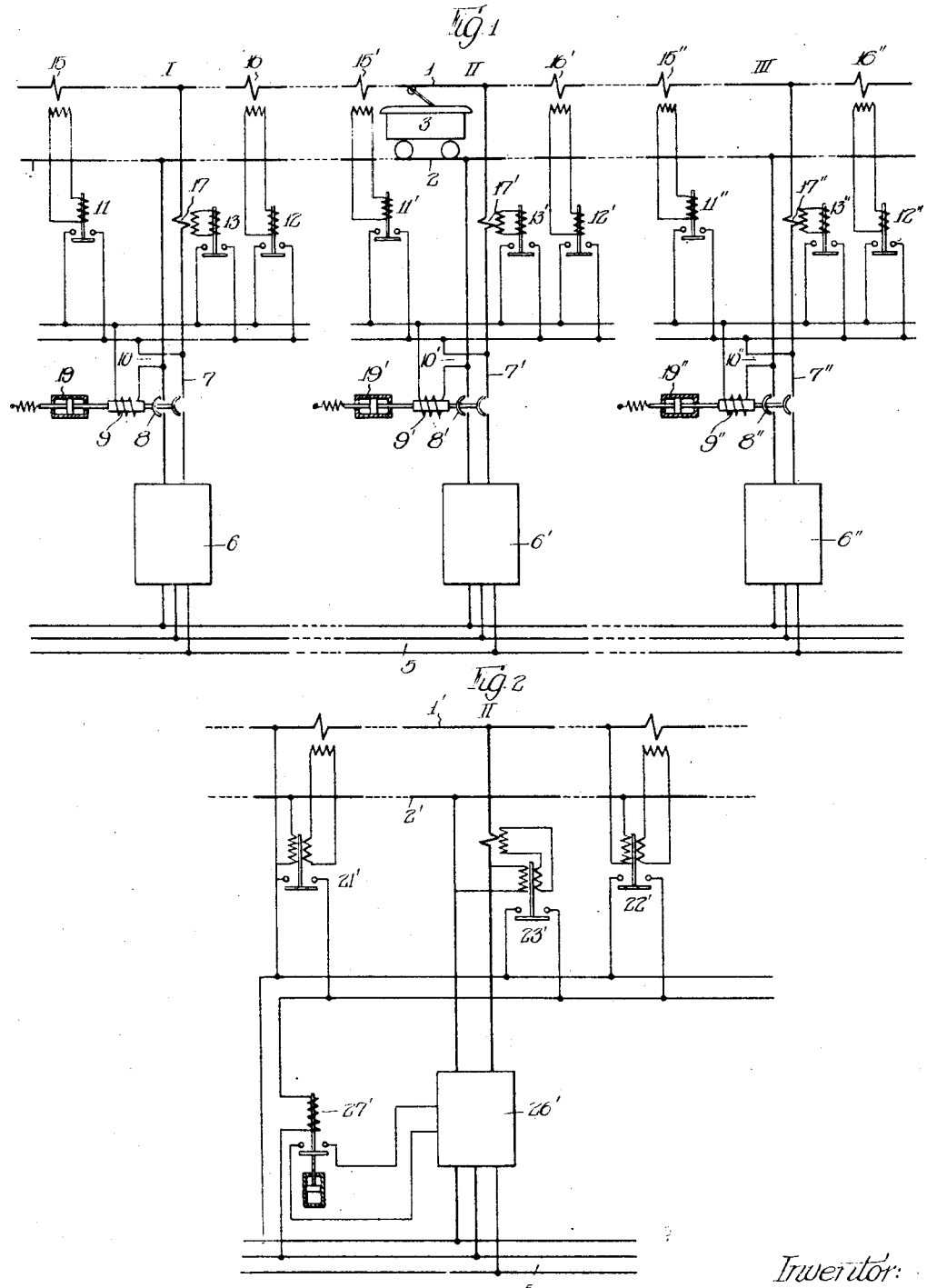
Inventor:
Fritz Schmidlin,
By Cromwell, Greist & Warden
Attys.
Witness:
R. Burkhardt.

Patented Aug. 6, 1929.

1,723,379

UNITED STATES PATENT OFFICE.

FRITZ SCHMIDLIN, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

AUTOMATIC SUBSTATION CONTROL.

Application filed May 25, 1927, Serial No. 194,039, and in Germany June 2, 1926.

This invention relates to automatic sub-station control, and it has particular relation to the control of sub-stations arranged along a power distribution line for feeding loads that move along said line, such as an electric vehicle that is supplied from a trolley line.

Among the objects of the invention is the provision of an improved control system of the foregoing character characterized by a simplified and more reliable control apparatus for automatically cutting in and out the sub-stations along said line as the load reaches the section of the line which is nearest said sub-station, and as it leaves the same, respectively. In accordance with the invention, this is effected in a more simple and economical way than heretofore, by connecting in the feeder leading from the current generating apparatus at the sub-station and the current distribution line or trolley, as well as in said current distribution line on both sides of the sub-station, maximum current relays, the relays controlling the connection of the sub-station apparatus to the line depending on the current flow therethrough.

The foregoing and other objects of the invention will be best understood from the following descriptions of exemplifications of the invention, reference being had to the accompanying drawings, wherein Figures 1 and 2 are circuit diagrams of electric current distribution systems embodying different forms of the invention.

In certain types of electric power distribution systems, particularly in electric railway systems, in which electric vehicles or trains are supplied with current from trolley lines, sub-stations are arranged along the line for supplying the electric current to said trolley line from a high voltage alternating-current transmision line. In such systems it is important to restrict as much as possible the current flow in the trolley line because of the higher losses and inefficiency in transmitting current on a relatively low voltage trolley line, and also because of the inductive interference caused by the current flow along such lines. In general, it is aimed to so arrange the current flow conditions in such systems that as a railway vehicle is moving along the trolley line the current for driving said vehicle shall be derived from the sub-station which is nearest to the section of the trolley line on which the vehicle is moving.

To this end, the sub-stations are provided with automatic mechanisms designed to connect the station to the trolley line on approach of a train or vehicle from an adjacent section, and to disconnect the station as a train or vehicle has proceeded to a point at which the supply may be more economically drawn from the next sub-station.

In the automatic control mechanisms used heretofore for securing such operation, serious difficulties were encountered by reason of the relatively sensitive and unsatisfactory operation of the apparatus utilized to ascertain the movement of the vehicle along the trolley line. In most of the systems very complicated and sensitive low voltage relays or contact-making volt meters, and low current relays, or contact-making air meters, were used for this purpose. The great sensitiveness of such apparatus was a source of constant trouble in the operation of such automatic mechanisms and constituted a serious drawback to the use thereof.

The present invention provides a novel arrangement by means of which the sub-stations are automatically put into operation and connected to or disconnected from the trolley line on entry or departure of a train, respectively, to or from the section of the line that is nearest to said sub-station, without taking recourse to the sensitive and troublesome type of control apparatus referred to above. According to one form of the invention this is accomplished by inserting a maximum current relay in the trolley line on each side of the sub-station and another maximum current relay in the sub-station feeder and arranging that the station is put into service and connected up by one of the trolley line relays as soon as a train passes by relay. The feeder relay then comes into action and assists to maintain the connection already made by the trolley relay. After the train has passed the second trolley line relay, the connection of the station is maintained by this relay until the train or vehicle has passed the first relay of the next station and caused the latter to establish connections of said second station to the trolley line. As soon as the second sub-station begins to feed the line, the relays of the first substation, being no longer traversed by the current, open and disconnect said first sub-station.

Referring to Figure 1, an electric railway supply line comprising a trolley wire 1 and a return rail 2 serves to operate electric vehicles such as locomotives 3 adapted to move along said trolley wire. Power is supplied to said trolley line 1 by means of a plurality of sub-stations I, II, III, situated along said line and arranged to convert high voltage alternating-current supplied to said sub-stations from a high voltage transmission line 5 into low voltage current for the trolley line, as by means of converting apparatus 6. The trolley line is thus divided into a number of sections as indicated by the vertical dotted lines, each section being designated by the numerals I, II, III, respectively, corresponding to the sub-station nearest the same. Each line section is supplied from the converter apparatus 6 by means of a feeder line 7. An electromagnetically operated circuit breaker 8 serves to connect or disconnect the current generating apparatus of the sub-station to the trolley line.

The circuit breaker 8 is actuated by an electromagnet 9 which may be energized through a pair of current supply wires 10 by means of either one of three maximum current relays 11, 12, 13. The maximum current relays 11 and 12 are actuated in accordance with the current flow conditions in the incoming and outgoing ends of the section of the trolley, as by means of current transformers 15 and 16. The third maximum current relay 13 is similarly energized in accordance with the current flow conditions in the feeder line leading from the generating apparatus 6 to the trolley line, as by means of a current transformer 17. The relays 11, 12, 13 are of a familiar type and are so adjusted as to close their contacts and establish an energizing circuit through the electromagnet 9 if the current through any of the relays exceeds a predetermined value. If said current drops below the value for which a relay is adjusted, the relay opens.

As seen in the drawing all three relays are connected in parallel so that if either one is closed, the electromagnet 9 is energized, thereby closing the circuit breaker and connecting the generating apparatus 6 to the trolley line. If all three relays are released, the electromagnet 9 is de-energized, causing the circuit breaker 8 to open, thus cutting off the supply of current from the generating apparatus to the trolley line. Each of the three sub-stations is provided with the same type of apparatus, the apparatus in the sub-stations II and III being designated with the same characters as the apparatus in substation I, but with the additional of one prime (') or two primes (''), respectively, to the designating characters.

The operation of the system is as follows: Let us assume that an electric locomotive is about to leave the trolley section nearest to the sub-station I and to enter the section nearest to the sub-station II. The vehicle is as yet supplied with current from the current generating equipment in sub-station I. As soon as the locomotive passes the current transformer 15' on the trolley section belonging to sub-station II, the relay 11' will be actuated by reason of the flow of current from the trolley section I through the current transformer 15' to the locomotive in the trolley section II. The actuation of relay 11' puts sub-station II in a condition for delivering current to the trolley line through its feeder 7', the relay causing energization of the electromagnet 9', and thereby closing the switch 8' which establishes the connection between the current generator 6' and the trolley section II. The generating equipment in sub-station II thereupon takes up the supply of current to the locomotive, the current flow from substation I becoming thus reduced to a value where the current in the maximum current relays is not sufficient to hold the same closed. As a result sub-station I is cut off from the trolley line leaving only sub-station II connected to supply the locomotive that is now moving on its section of the line. As long as the current supply from the generating equipment 6' is above a predetermined value, sufficient to actuate the maximum current holding relay 13' on the feeder 7' of the sub-station, the line will continue to be supplied with current from said sub-station. Relay 11', however, will open since only a small quantity of current is now flowing into the trolley section II from sub-station I.

As the train proceeds from the trolley section II towards sub-station III and passes the current transformer 16', sub-station II will remain connected to the line until the current is taken over by the next following sub-station III, when the locomotive passes the current transformer 15'' of the trolley section III, and in turn causes sub-station III to be connected to the trolley line in the same manner as described hereinabove in connection with sub-station II.

As will be seen from the foregoing, when the train is moving in one direction only as described above, that is, in the direction from sub-station I to sub-station III, the relays 12, 12', 12'', at the end of the trolley sections belonging to the several sub-stations are not called to perform any particular function except that by adjusting their calibration and setting, it is readily possible to vary the relative periods during which the supply of current between the following sub-stations will overlap. However, the principal function of said relays, 12, 12', 12'', is to successively connect the respective sub-stations when the locomotive or train is moving in opposite direction from sub-station III toward sub-station I, functioning in a way analogous to relays 11, 11', 11'''.

In the foregoing arrangement satisfactory operation of the system is readily secured by reason of the fact that all the three maximum current relays 11, 12, 13, 11', 12', 13', etc., act on a single intermediate relay or switch energizing coil 9, 9', which alone controls the operation of the respective sub-stations. Accordingly, as long as a train which causes connection of a sub-station to a section of the trolley line remains on the respective section, it will be supplied by said sub-station.

As seen in the drawing, the cricuit breaker 8 is provided with a time-delay mechanism 19, in the form of a dash pot, in order to prevent premature action of the circuit breaker in connecting, and particularly in disconnecting the sub-stations from the line in case the current supply from a sub-station should momentarily decrease below the value for which the relays are set or if a load should only momentarily appear on a section of the trolley line. The setting of the relays and of their apparatus may also be so chosen that there is discriminative action in the operation of the sub-stations, some of the sub-stations being connected up for heavy trains only and other sub-stations being connected for all the trains that pass through the associated section of the trolley line.

In the system shown in Figure 2 the relays 21, 22, 23, 21', 22', 23', etc., which control the actuation of the sub-stations are of the watt meter type and operate to cause the respective sub-stations to be put in operation and connected to their trolley line section when the power flow registered by the relays is about a predetermined value. The three relays 21, 22, 23 of each sub-station are energized from the incoming and outgoing ends of the trolley line sections and from the sub-station feeder line in a way similar to the relays of Figure 1 except that in addition to the current element of the relays there is also a voltage element, as is familiar in the art.

In the arrangement shown in Figure 2 the power for controlling the energization of the sub-station through the action of the relays 21, 22, 23, is derived from the alternating current line 5 instead of from the direct current line, as in the arrangement of Figure 1. Any other auxiliary power supply may be used instead. The sub-station equipment in Figure 2 is indicated by a square 25, 26, as the invention is not intended to be restricted to the use of rotary converters, such as diagrammatically indicated in Figure 1, but is generally applicable to any type of power generating apparatus that is arranged to be automatically put into operation and connected to the line by means of a master control relay, such as indicated at 27.

The invention is susceptible of many other modifications and it is accordingly desired that the appended claims be given a broad construction.

I claim as my invention:

1. An electrical system of distribution, a distribution line, a plurality of power supply stations arranged along said line, feeders connecting said power generating stations to said line, a load adapted to be supplied from different points along said line, and means for causing said load to be principally supplied from the sub-station nearest to the section of the line to which said load is connected, said means comprising current relays connected in said line respectively on opposite sides of the station and a current relay connected in the feeder line from said station, and means actuated by either one of said first mentioned relays for causing the associated station to supply energy to said line when the power flow through said second mentioned relay is above a predetermined value.

2. In a power distribution system, a distribution line, a load movable along said line to be supplied therefrom, a plurality of sub-stations arranged along said line for feeding the same, feeder connections between said sub-stations and the adjacent points of the line, means for causing said sub-stations to automatically take over the supply of current to said line as the load proceeds thereon in a particular direction comprising a maximum current relay connected in the feeder of the sub-station, a relay in the line section ahead of said feeder, and means responsive to an increase of the current flow through either of said relays above a predetermined value for causing the associated sub-station to supply current to said line, said means being responsive to a decrease of the current flow through said relays for disconnecting said sub-stations from said line.

3. In a power distribution system, a distribution line, a load movable parallel to said line to be supplied therefrom, a plurality of sub-stations along said line for supplying different portions thereof, feeder connections from said sub-stations to said line, means for automatically providing current from the nearest sub-station to said load at any point on said line comprising a current relay operatively connected to said line, a relay operatively connected to said feeder connections, and switch means in said feeder connections operable by said relays upon variation of the current therein beyond predetermined limits.

4. In a power distribution system, a distribution line, a load movable parallel to said line to be supplied therefrom, a plurality of sub-stations along said line for supplying different portions thereof, feeder connections from said sub-stations to said line, means for automatically providing current from the nearest sub-station to said load at any point on said line comprising a current relay connected to said distribution line and to said feeder connections on each side thereof, a holding relay connected to said feeder connections and operable by either of said current relays, and electro-magnetically controlled switch means in said feeder connections operable by said relays upon variation of the current therein beyond predetermined limits.

In testimony whereof I have hereunto subscribed my name this 5th day of May, A. D. 1927, at Zurich, Switzerland.

FRITZ SCHMIDLIN.